United States Patent
Desserrey et al.

(10) Patent No.: US 11,763,818 B2
(45) Date of Patent: Sep. 19, 2023

(54) SYNCHRONOUS AUDIO AND TEXT GENERATION

(71) Applicant: Snap Inc., Santa Monica, CA (US)

(72) Inventors: Laurent Desserrey, Los Angeles, CA (US); Jeremy Baker Voss, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 180 days.

(21) Appl. No.: 16/949,121

(22) Filed: Oct. 14, 2020

(65) Prior Publication Data
US 2022/0115018 A1    Apr. 14, 2022

(51) Int. Cl.
| | |
|---|---|
| G10L 15/26 | (2006.01) |
| G10L 15/22 | (2006.01) |
| G10L 15/30 | (2013.01) |
| G10L 25/51 | (2013.01) |
| G10L 25/90 | (2013.01) |
| H04L 51/04 | (2022.01) |

(52) U.S. Cl.
CPC .............. *G10L 15/26* (2013.01); *G10L 15/22* (2013.01); *G10L 15/30* (2013.01); *G10L 25/51* (2013.01); *G10L 25/90* (2013.01); *H04L 51/04* (2013.01); *G10L 2015/223* (2013.01)

(58) Field of Classification Search
USPC ...................................................... 704/1–504
See application file for complete search history.

(56) References Cited

U.S. PATENT DOCUMENTS

| | | | | |
|---|---|---|---|---|
| 8,693,377 | B1 * | 4/2014 | Hazy | H04M 3/53366 |
| | | | | 379/88.16 |
| 10,074,381 | B1 | 9/2018 | Cowburn | |
| 10,431,216 | B1 * | 10/2019 | Lemon | G06F 3/0304 |
| 10,530,731 | B1 * | 1/2020 | Wu | H04L 51/046 |
| 10,573,312 | B1 * | 2/2020 | Thomson | G10L 15/22 |
| 10,708,383 | B2 * | 7/2020 | Garg | H04L 51/48 |
| 11,017,778 | B1 * | 5/2021 | Thomson | H04M 3/42382 |
| 11,145,312 | B2 * | 10/2021 | Thomson | G10L 15/26 |
| 11,170,761 | B2 * | 11/2021 | Thomson | G10L 15/06 |
| 11,249,614 | B2 * | 2/2022 | Brody | G01C 21/3682 |

(Continued)

OTHER PUBLICATIONS

"International Application Serial No. PCT/US2021/054750, International Search Report dated Jan. 28, 2022", 4 pgs.

(Continued)

*Primary Examiner* — Marcus T Riley
(74) *Attorney, Agent, or Firm* — Schwegman Lundberg & Woessner, P.A.

(57) ABSTRACT

A messaging system, which hosts a backend service for an associated messaging client, includes a voice chat system that provides voice chat functionality that enables users to dictate their messages, while delivering the resulting message to the intended recipient as both the associated audio and text content. When a user at a sender client device begins dictating a voice message, the voice chat system starts converting the received audio stream into text and, also, starts communicating the audio content together with the generated text to the recipient client device. The recipient user can listen to the voice message and read the text generated from the audio in real time. It is also possible for the recipient user to consume the voice message in a textual form only, if the sound at the client device is undesirable.

20 Claims, 9 Drawing Sheets

(56) References Cited

U.S. PATENT DOCUMENTS

| | | | |
|---|---|---|---|
| 11,330,094 B2* | 5/2022 | Robertson | H04M 1/72412 |
| 2008/0295040 A1 | 11/2008 | Crinon | |
| 2017/0085506 A1* | 3/2017 | Gordon | H04L 51/066 |
| 2018/0139158 A1 | 5/2018 | Eagleton | |
| 2019/0124177 A1* | 4/2019 | Garg | H04L 67/306 |
| 2019/0130629 A1 | 5/2019 | Chand et al. | |
| 2019/0171338 A1* | 6/2019 | Voss | H04L 65/403 |
| 2020/0175987 A1* | 6/2020 | Thomson | G10L 15/26 |
| 2020/0243094 A1* | 7/2020 | Thomson | H04M 3/42382 |
| 2022/0084295 A1* | 3/2022 | Smith | G06T 19/006 |
| 2022/0115018 A1* | 4/2022 | Desserrey | H04L 51/04 |
| 2022/0147236 A1* | 5/2022 | Alvi | H04L 51/10 |
| 2022/0199079 A1* | 6/2022 | Hanson | H04L 51/02 |

OTHER PUBLICATIONS

"International Application Serial No. PCT/US2021/054750, Written Opinion dated Jan. 28, 2022", 6 pgs.

"International Application Serial No. PCT/US2021/054750, International Preliminary Report on Patentability dated Dec. 6, 2022", 8 pgs.

* cited by examiner

SYNCHRONOUS AUDIO AND TEXT GENERATION

TECHNICAL FIELD

The present disclosure relates generally to facilitating interactions between client devices over a network.

BACKGROUND

The popularity of computer-implemented tools that permit users to access and interact with content and other users online continues to grow. For example, various computer-implemented tools exist that permit users to interact and share content with other users through messaging applications. Some of such computer-implemented tools, termed applications or apps, can be designed to run on a mobile device such as a phone, a tablet, or a watch.

Existing messaging apps permit users to exchange text messages, as well as multimedia messages. For example, a messaging app may include functionality that permits a sender to dictate an audio message and then send it to a recipient. The recipient, upon receiving the message can play the associated audio by interacting with a visual control representing the received audio message.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some examples are illustrated by way of example, and not limitation, in the figures of the accompanying drawings in which.

DETAILED DESCRIPTION

A messaging system, which hosts a backend service for an associated messaging client, includes a voice chat system that provides functionality for facilitating synchronous audio and text generation—voice chat functionality. The voice chat functionality enables a user to dictate a message and delivers the resulting message to the intended recipient as both audio and text content as the user is dictating the message. For example, the messaging client displays a chat conversation user interface (UI) that includes a visual control, such as a stylized picture of a microphone, that is actionable to effectuate a voice chat. When a user at a sender client device taps a designated control on the chat conversation UI and begins dictating a voice message, the voice chat system starts converting the received audio stream into text and, also, starts delivering the audio content together with the generated text to the recipient client device. If the chat conversation UI is active at the recipient client device, the recipient user can consume the message live, in near real time. The recipient user can listen to the voice message and read the text generated from the audio if the volume of the chat conversation UI is on. It's also possible to have the volume of the chat conversation UI audio off or muted, which permits the recipient user to consume the voice message in a textual form if the sound of the client device is undesirable (as when the recipient user is in class or in a meeting). The benefit for the sender is the speed and emotion of voice, while the benefit for the recipient is that they may consume the message via audio or text, synchronously or asynchronously. In addition, in some examples, a voice chat system may be configured to analyze audio content characteristics, such as, tone, pitch, and volume and match it to a qualitative characteristic of a voice message, such as "talking loudly," "talking softly," "whispering," "laughing," and so forth.

Networked Computing Environment

Figure 1:
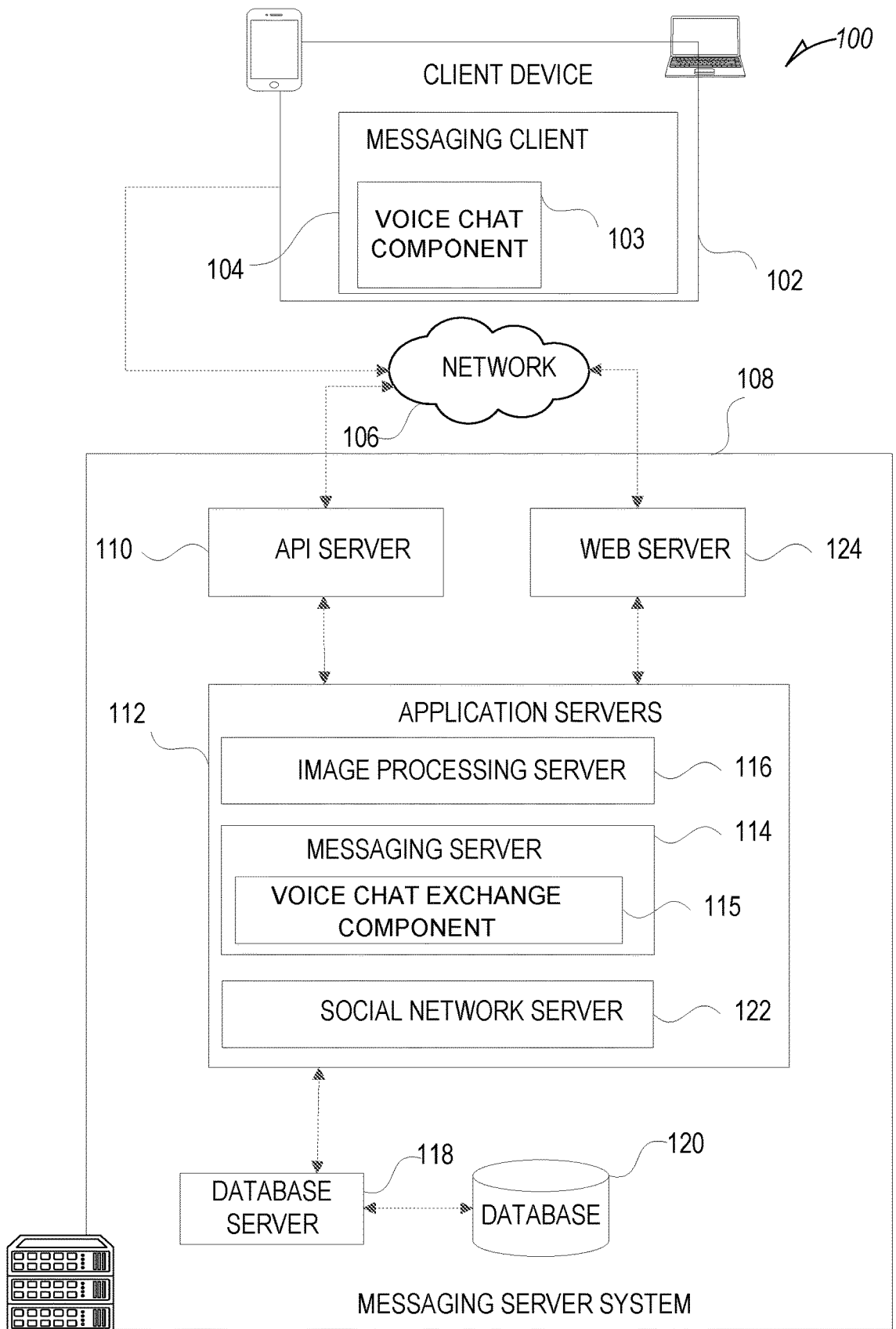
FIG. 1 is a diagrammatic representation of a networked environment in which the present disclosure may be deployed, in accordance with some examples.

FIG. 1 is a block diagram showing an example messaging system 100 for exchanging data (e.g., messages and associated content) over a network, within which a voice chat system can be implemented. The messaging system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet).

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data). The messaging client 104 is shown as including a voice chat component 103. The voice chat component 103 is configured to facilitate a voice chat between messaging clients by, for example, causing presentation of a chat conversation UI, receiving audio input, transcribing the audio input into a text format, and causing communicating of the audio input with or without the associated transcribed text, to the recipient device. The transcribing of the audio input can be performed at the client device 102, as well as at the messaging server system 108.

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120 that stores data associated with messages processed by the application servers 112. For example, the database 120 stores audio content from voice chat messages associated with the respective sender identifications, with or without the associated text. For the purposes of this description, a voice chat message includes an audio message (or a reference to the audio message) and the associated text representation of the audio. The audio content from a voice chat message may persist until an instruction to delete the voice chat message is received at the messaging system 108.

Similarly, a web server 124 is coupled to the application servers 112, and provides web-based interfaces to the application servers 112. To this end, the web server 124 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114.

Figure 3:
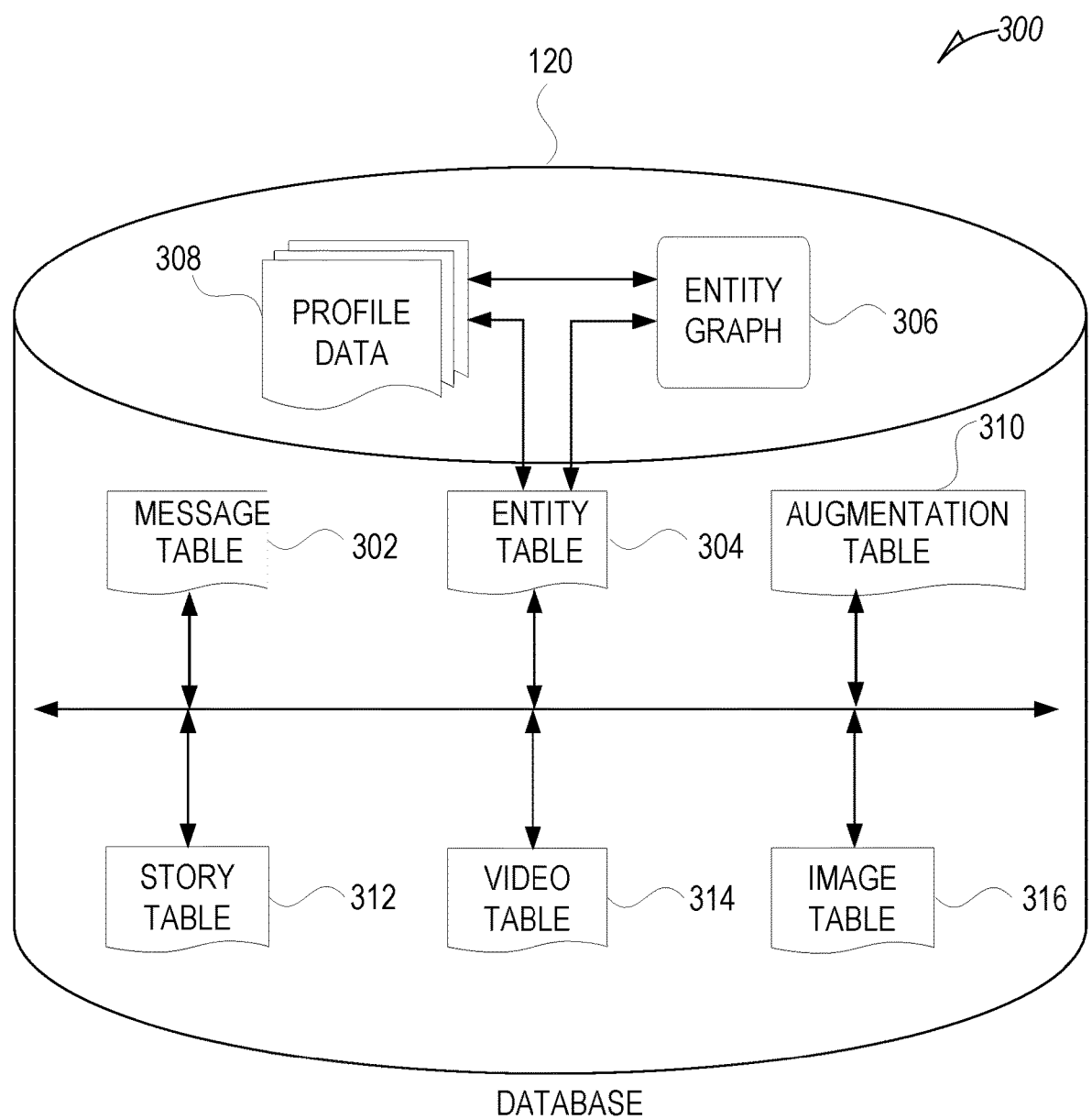
FIG. 3 is a diagrammatic representation of a data structure as maintained in a database, in accordance with some examples.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system 100 with which a particular user has relationships or is "following," and also the identification of other entities and interests of a particular user.

Also shown in FIG. 1 is a voice chat component 115 provided at the messaging server 114. The voice chat exchange component 115 is configured to cooperate with the voice chat component 104 to facilitate voice chat between messaging clients by, for example, causing presentation of a chat conversation UI, receiving audio input, transcribing the audio input into a text format, and causing communicating of the audio input with or without the associated transcribed text, to the recipient device. The voice chat exchange component 115 and the voice chat components 104, collectively, may be referred to as a voice chat system, which is shown as reference number 208 in FIG. 2.

System Architecture

Figure 2:
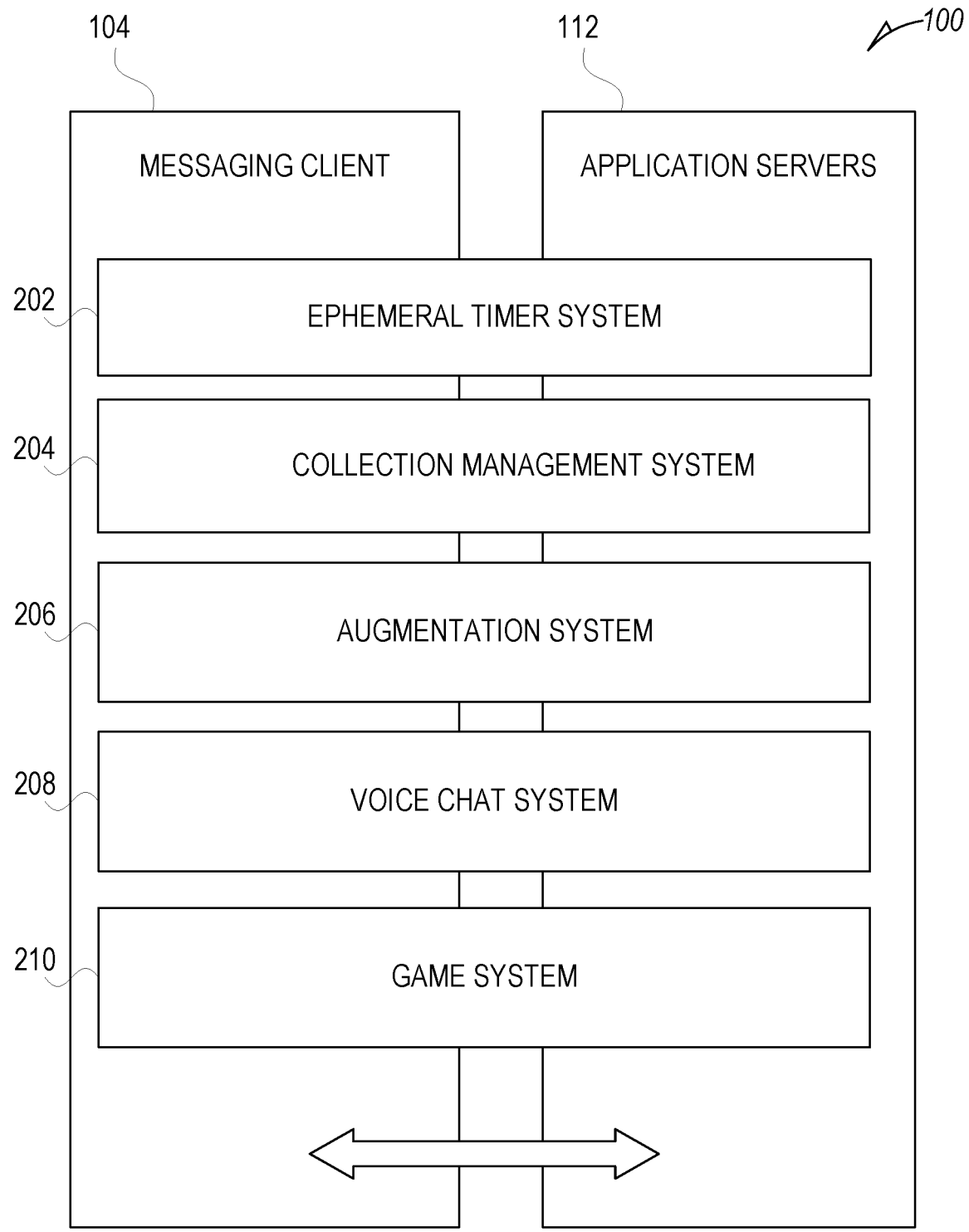
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 112. The messaging system 100 embodies a number of subsystems, which are supported on the client-side by the messaging client 104 and on the sever-side by the application servers 112. These subsystems include, for example, an ephemeral timer system 202, a collection management system 204, an augmentation system 206, and a game system 210. The ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below. The collection management system 204 is responsible for managing sets or collections of media (e.g., collections of text, image video, and audio data). Such a collection may be made available for a specified time period, such as the duration of an event to which the content relates. For example, content relating to a music concert may be made available as a "story" for the duration of that music concert. The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 104 based on a geolocation of the client device 102. In another example, the augmentation system 206 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. The media overlays may be stored in the database 120 and accessed through the database server 118. The game system 210 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards.

Also shown in FIG. 2 is a voice chat system 208. As explained above, the voice chat system 208 includes one or more components provided with the messaging client 104 of FIG. 1, as well as one or more components provided at the messaging server 114 of FIG. 1. The voice chat system 208 is configured to facilitate a voice chat between the messaging clients 104, which enables a user to dictate a message and deliver the resulting message to the intended recipient as both the audio and text content as the user is dictating the message. The voice chat system 208 utilizes speech recognition technology such as Automatic Speech Recognition (ASR) or Speech To Text (STT). Speech recognition technology may be based on the algorithm of acoustic and language modeling, where the acoustic modeling represents the relationship between linguistic units of speech and audio signals and the language modeling matches sounds with word sequences.

Data Architecture

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any particular one message, at least message sender data, message recipient (or receiver) data, and a payload. Further details regarding information that may be included in a message, and included within the message data stored in the message table 302 is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

The database 120 also stores augmentation data, such as overlays or filters, in an augmentation table 310. The augmentation data is associated with and applied to videos (for which data is stored in a video table 314) and images (for which data is stored in an image table 316). Other augmentation data that may be stored within the image table 316 includes augmented reality content items (e.g., corresponding to applying Lenses or augmented reality experiences). An augmented reality content item may be a real-time special effect and sound that may be added to an image or a video.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to enable a sending user to add specific content to his or her personal story.

Data Communications Architecture

Figure 4:
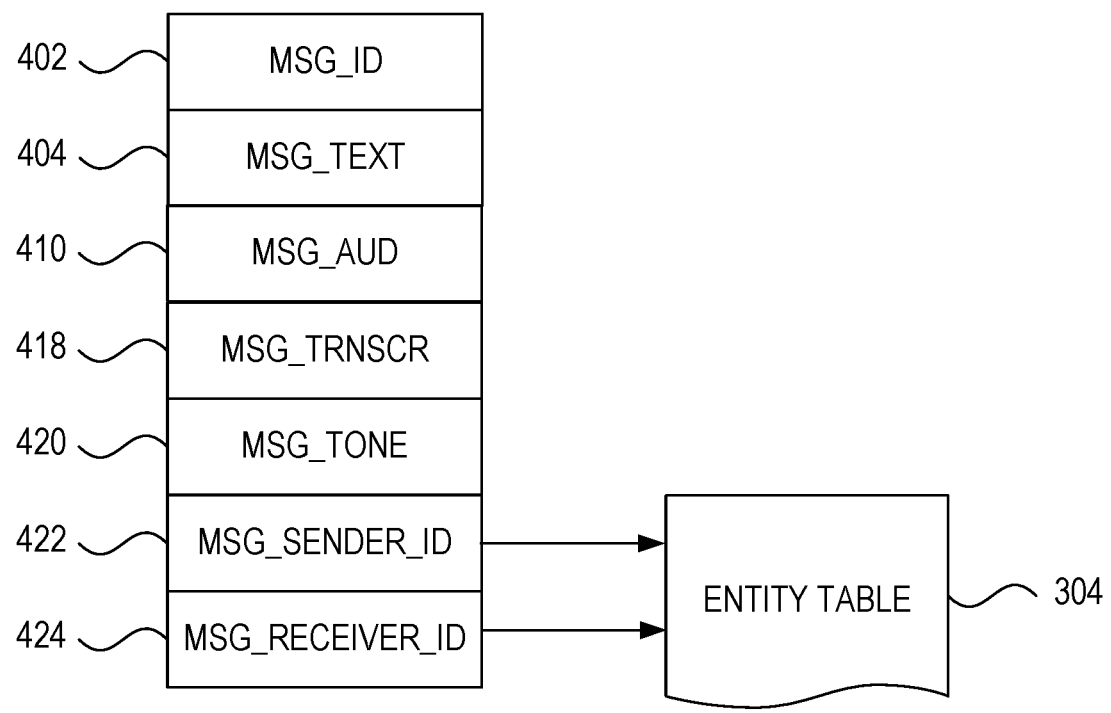
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 114. The content of a particular message 400 is used to populate the message table 302 stored within the database 120, accessible by the messaging server 114. Similarly, the content of a message 400 is stored in memory as "in-transit" or "in-flight" data of the client device 102 or the application servers 112. A message 400 is shown to include the following example components:

- message identifier 402: a unique identifier that identifies the message 400.
- message text payload 404: text, to be generated by a user via a user interface of the client device 102, and that is included in the message 400.
- message audio payload 410: audio data, captured by a microphone or retrieved from a memory component of the client device 102, and that is included in the message 400.
- message audio transcription payload 418: audio transcription data, generated from audio captured by a microphone or retrieved from a memory component of the client device 102, and that is included in the message 400.
- message audio tone payload 420: audio tone data, inferred from audio captured by a microphone or retrieved from a memory component of the client device 102, and that is included in the message 400.
- message sender identifier 422: an identifier (e.g., a messaging system identifier, email address, or device identifier) indicative of a user of the Client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, values stored within the message sender identifier 422 and the message receiver identifier 424 may point to user records stored within an entity table 304. The value stored in the message audio payload 410 may point to a location in the persistent storage on the server storing the associated audio content captured by a microphone in response to a request to communicate a voice chat message from the sender's client device.

Time-Based Access Limitation Architecture

Figure 5:
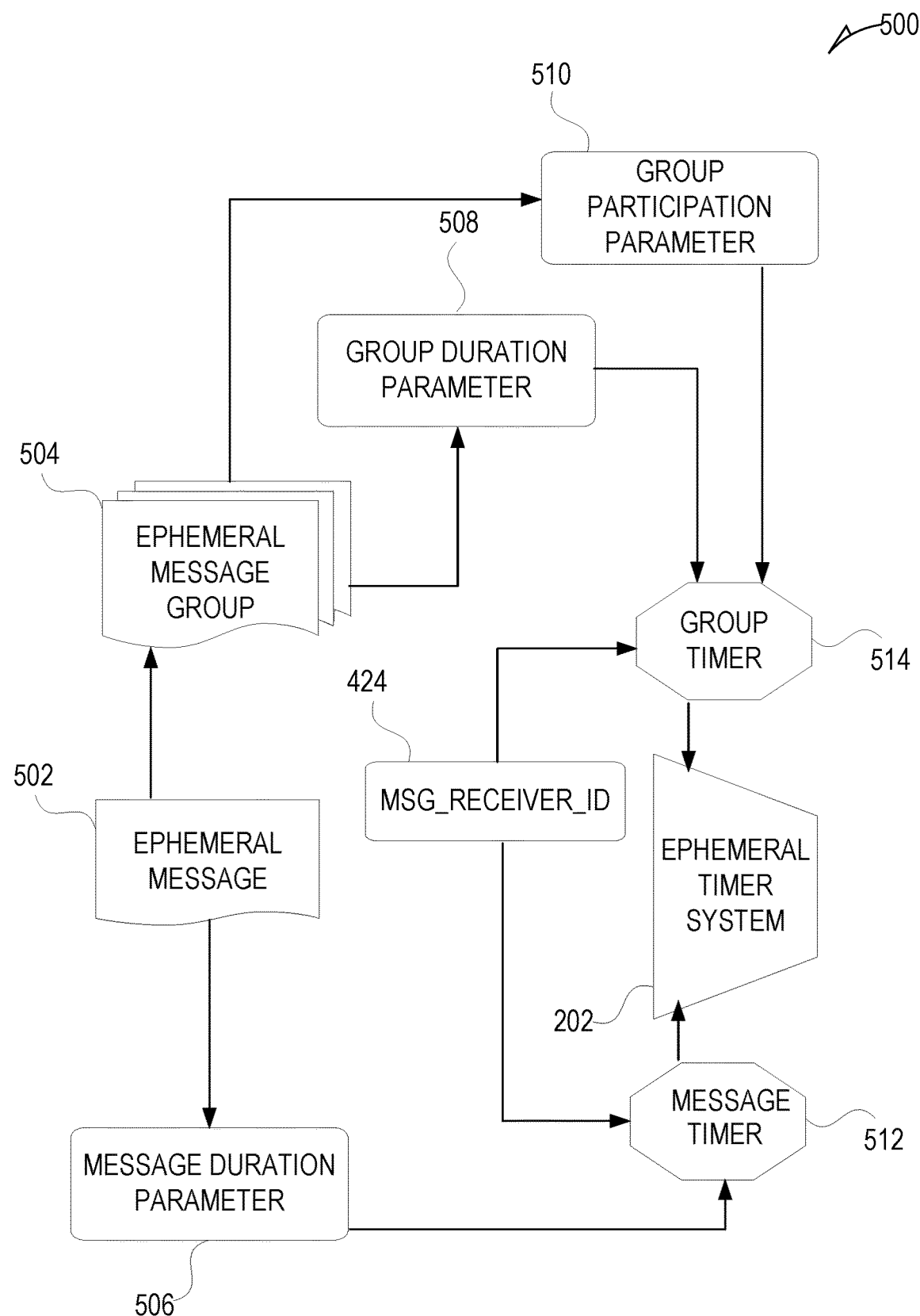
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is associated with an identification of a sending user (MSG_SENDER_ID 422 of FIG. 4) and is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506. In some examples, where an ephemeral message 502 is a voice chat message, it may be available to a receiving user for viewing the text and for listening to the associated audio clip for longer periods of time, such as, 24 hours or until the vice chat message is deleted by the sending user. In some examples, the audio clip from a voice chat message is stored in the database 120 of FIG. 1 and is available to a receiving user for listening for a predetermined period of time but not after the sending user deletes the voice chat message.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

It will be noted that access to content such as a voice chat may or may not be made ephemeral in the messaging system 100 of FIG. 1. As mentioned above, the audio content associated with a voice chat message may be available to a receiving user for listening as long as the sending user does not delete the voice chat message. Example operations performed by the voice chat system 208 of FIG. 2 are described below, with reference to FIG. 6.

Figure 6:
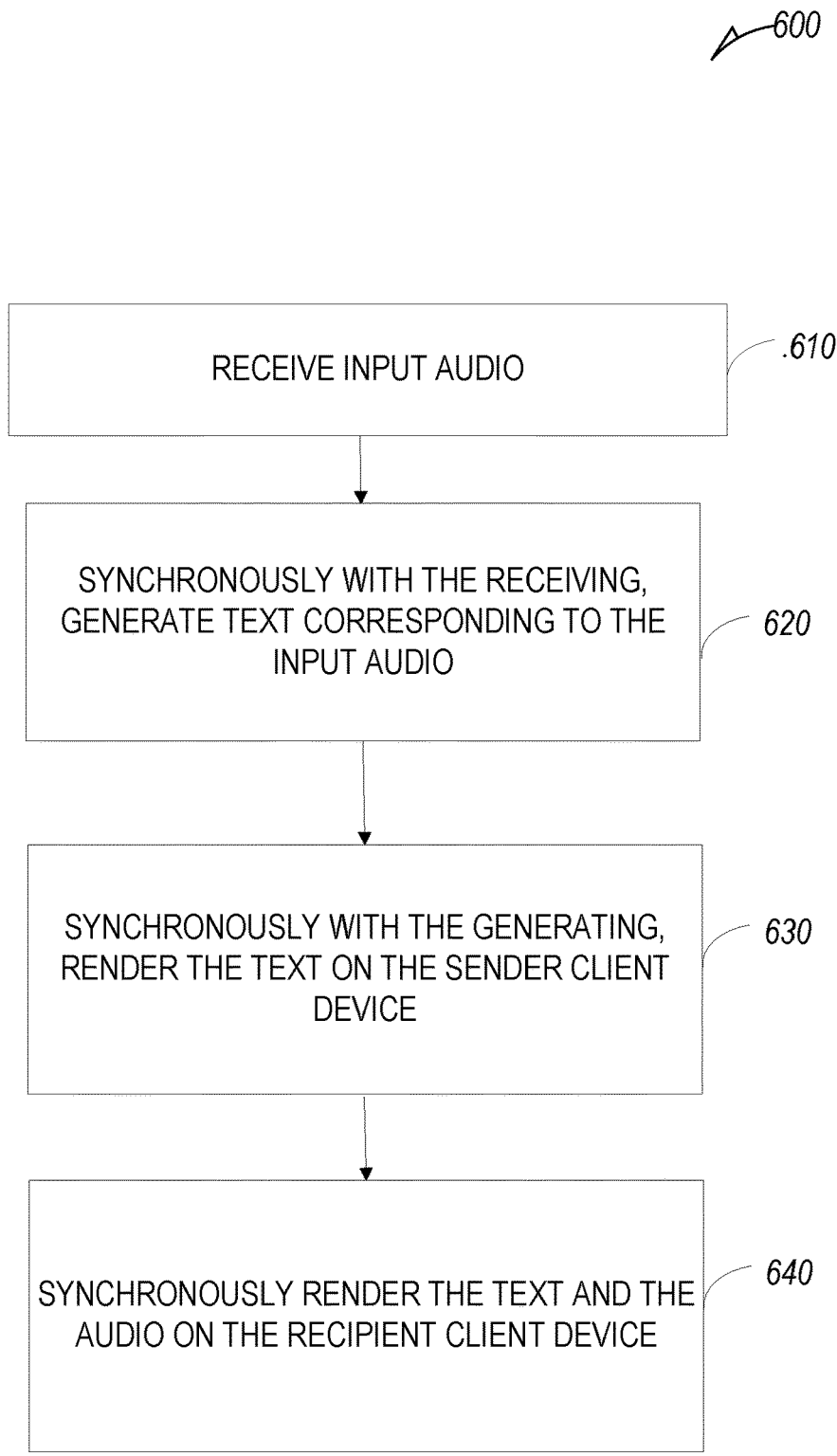
FIG. 6 is a flowchart of a method for facilitating synchronous audio and text generation in a messaging system, in accordance with some examples.

FIG. 6 is a flowchart of a method 600 for facilitating a voice chat between users of the messaging client 104 of FIG. 1. The method 600 may be performed by processing logic that may comprise hardware (e.g., dedicated logic, programmable logic, microcode, etc.), software, or a combination of both. Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

In one example embodiment, some or all processing logic resides at the client device 102 of FIG. 1 and/or at the messaging server system 108 of FIG. 1. The method 600 commences in response to detecting, in a messaging system for exchanging data over a network (e.g., the messaging system 100 of FIG. 1), a request to communicate a voice chat message from a sender client device associated with a sender identification to a recipient associated with a recipient identification At operation 610, the messaging system receives an input audio stream associated with the sender identification. Operation 610 may be performed as a user starts dictating a voice message to be sent as a voice chat. At operation 620 the messaging system generates text corresponding to audio content from the input audio stream in real time, synchronously while receiving of the input audio stream. As explained above, when a user, who is the sender of a voice chat message, starts dictating a voice message, the voice chat system 208 of FIG. 2 starts converting the received audio stream into text (operation 620). The text corresponding to audio content from the input audio stream is generated by a speech recognition engine that may be included in a messaging client implemented by one or more processors of the sender client device and in a messaging client implemented by one or more processors of the recipient client device, and may also (or instead) be included at the backend system providing the respective messaging clients (e.g., at the messaging server system 108 of FIG. 1). The speech recognition engine, in one example, uses acoustic modeling that represents the relationship between linguistic units of speech and audio signals and the language modeling that matches sounds with word sequences.

At operation 630, the messaging system renders the generated text on the sender client device synchronously with the receiving of the input audio stream, such that the sender of the voice chat message can see the audio being converted into text as he or she speaks into the microphone. The voice chat message comprising the generated text is inserted in a chat conversation UI generated by the messaging system 100 for display at the sender client device. At operation 640 the messaging system causes the generated text and the audio content from the input audio stream to synchronously render on a recipient client device associated with the recipient identification. The voice chat message comprising the generated text is also inserted in a chat conversation UI generated by the messaging system 100 for display at the recipient client device. As explained above, the recipient user can listen to the voice message and read the text generated from the audio if the volume of the chat conversation UI is on. It is also possible to have the volume of the chat conversation UI audio off or muted, which permits the recipient user to consume the voice message in a textual form only. The chat conversation UI generated by the messaging system 100 for display at the sender client device and the chat conversation UI generated by the messaging system 100 for display at the recipient client device are included in respective messaging clients implemented by one or more processors of the sender client device and the recipient client device.

In some examples, the operations of the method 600 include analyzing one or more audio characteristics of the input audio stream to determine a qualitative characteristic representing the input audio stream and including a representation of the qualitative characteristic in the chat conversation UI generated by the messaging system 100 for display at the recipient client device. The representation of a qualitative characteristic may indicate a whisper, a laugh, or the like.

Figure 7:
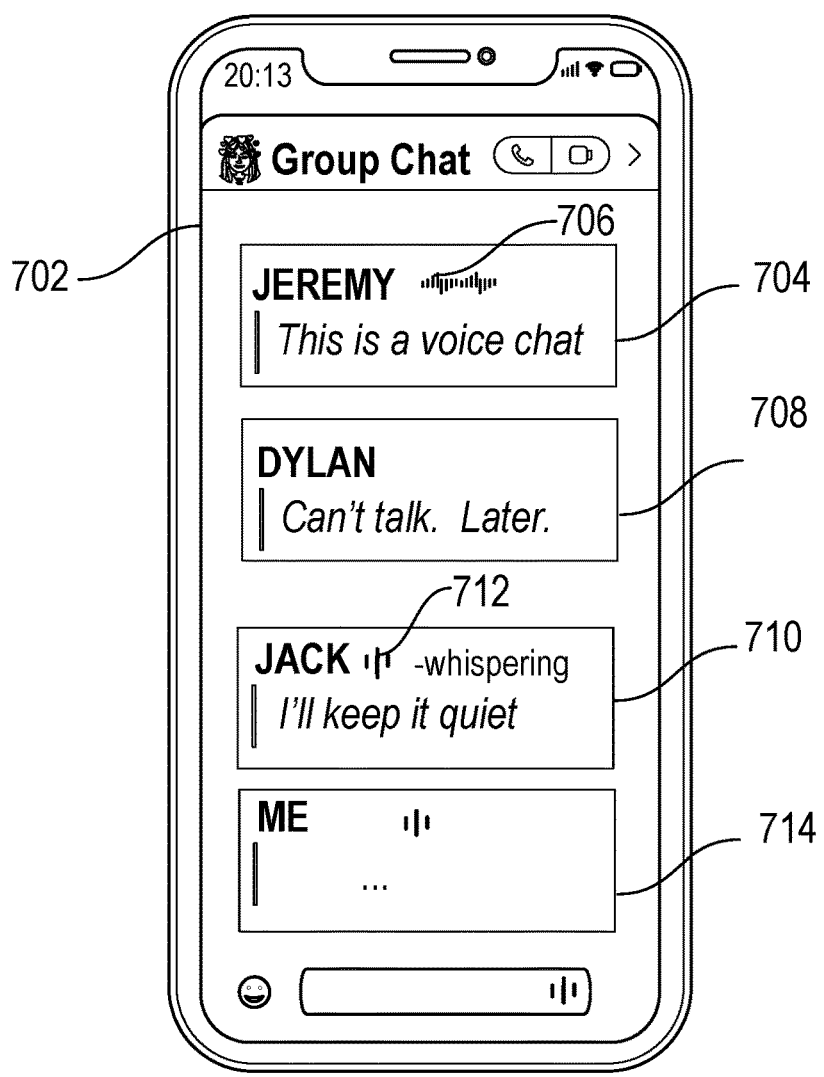
FIG. 7 is a diagram illustrating an example chat conversation user interface.

FIG. 7 is a diagram 700 illustrating an example chat conversation UI 702 provided at a client device. As shown in FIG. 7, the chat conversation UI 702 displays a message section 704 that includes the identification of the sender ("JEREMY"), a visual indication 706 of an audio source and the text that corresponds to the audio message "This is a voice chat." The visual indication 706 of an audio source is positioned in the chat conversation UI 702 as associated with the generated text and as associated with the identification of the sender. The visual indication 706 or, in some examples, the message section 704, is actionable to playback the audio content corresponding to the displayed text.

Also shown in the chat conversation UI 702 is a message section 708 that includes the identification of the sender ("DYLAN"), and the text ("Can't talk. Later."). The message section 708 does not have an indication of an audio source because the text was typed by the sender rather than dictated. Also shown in the chat conversation UI 702 is a message section 710 that includes the identification of the sender ("JACK"), a visual indication 712 of an audio message being in progress and the text that corresponds to the audio message that is being dictated ("I'll keep it quiet"). The message section 710 also includes a representation of the qualitative characteristic of the audio message that is being dictated—"whispering."

A message section 714 indicates readiness of the chat conversation UI 702 to receive audio input from the user controlling the client device. The message section 714 includes the identification of the user controlling the client device ("ME"), a visual indication of an audio message being in progress and an empty space adjacent to the identification of the user controlling the client device ("ME"). In some examples, the space adjacent to the identification of the user controlling the client device ("ME") may include an invitation to start talking.

Figure 8:
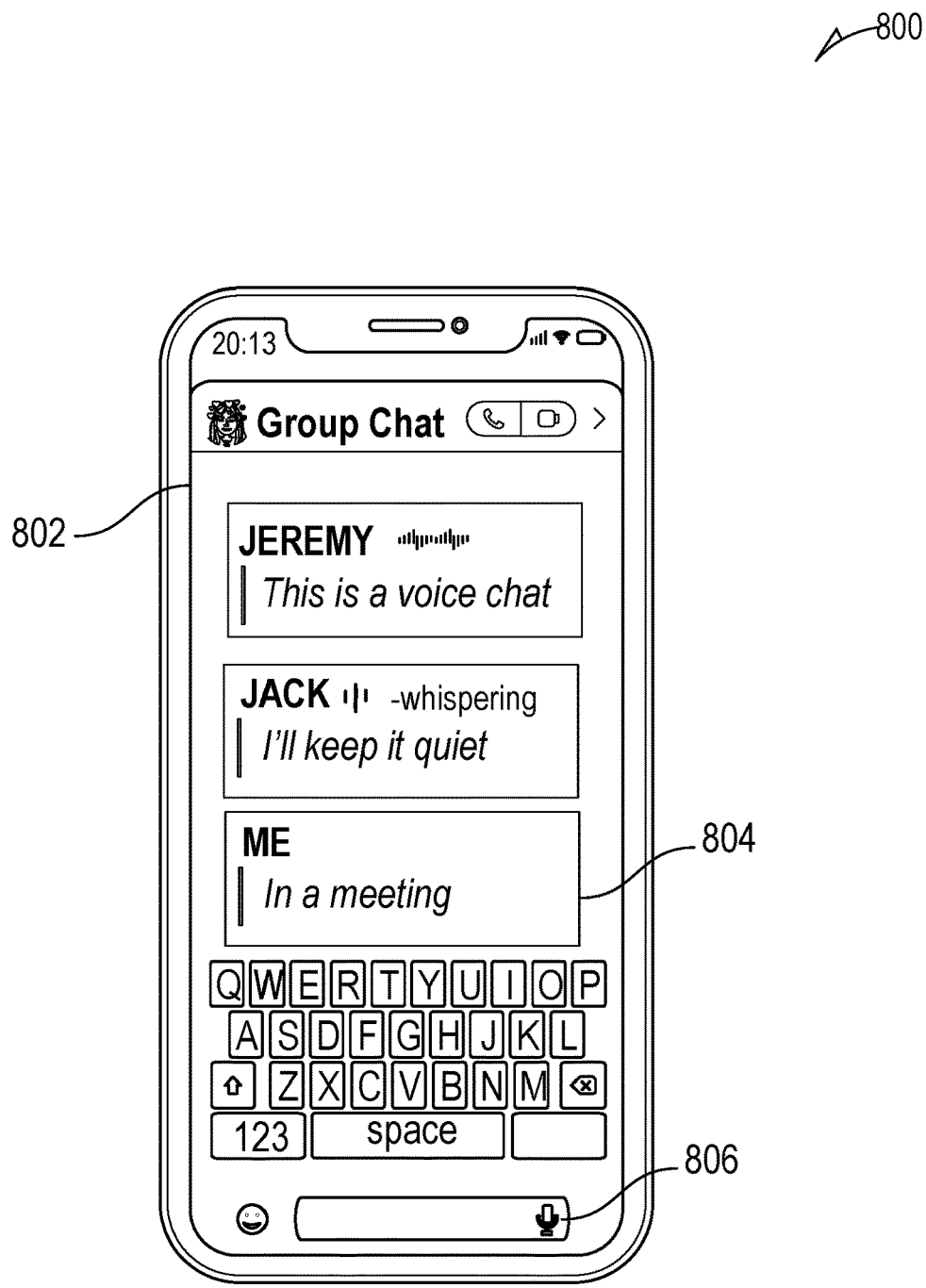
FIG. 8 is a diagram illustrating a further example chat conversation user interface.

FIG. 8 is a diagram 800 illustrating a further example chat conversation UI 802 provided at a client device. A message section 804 displays a text message previously sent the user controlling the client device ("ME"). The chat conversation UI 802 also includes a visual control 806, (here, a stylized picture of a microphone) actionable to effectuate voice chat enabling the user controlling the client device to start dictating a message.

Machine Architecture

Figure 9:
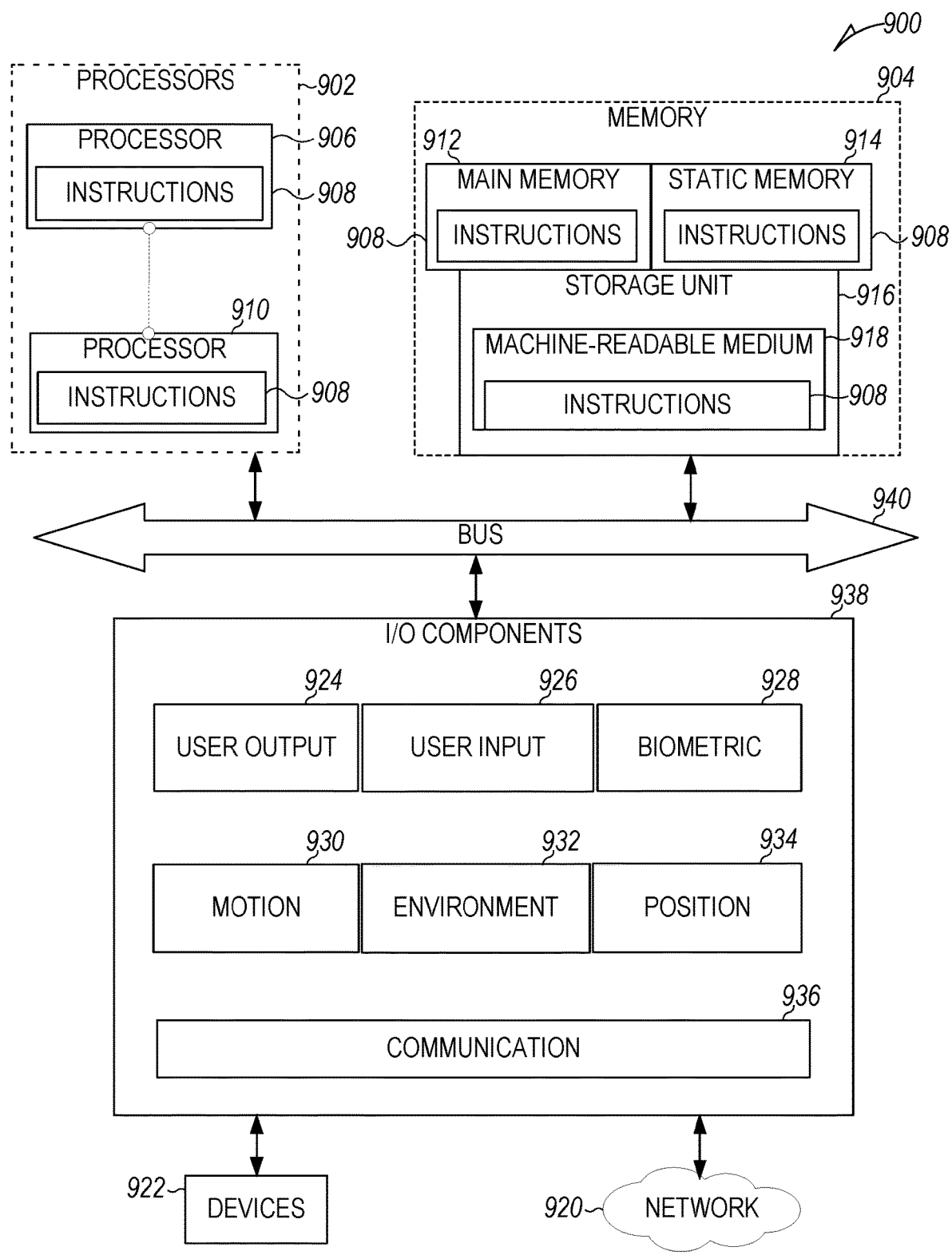
FIG. 9 is a diagrammatic representation of a machine in the form of a computer system within which a set of instructions may be executed for causing the machine to perform any one or more of the methodologies discussed herein, in accordance with some examples.

FIG. 9 is a diagrammatic representation of the machine 600 within which instructions 608 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein. The machine 900, for example, may comprise the client device 102 or any one of a number of server devices forming part of the messaging server system 108. In some examples, the machine 900 may also comprise both client and server systems, with certain operations of a particular method or algorithm being performed on the server-side and with certain operations of the particular method or algorithm being performed on the client-side.

The machine 900 may include processors 902, memory 904, and input/output I/O components 938, which may be configured to communicate with each other via a bus 940. In an example, the processors 902 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single-core, a single processor with multiple cores (e.g., a multi-core processor), multiple processors with a single core, multiple processors with multiples cores, or any combination thereof.

The memory 904 includes a main memory 912, a static memory 914, and a storage unit 916, both accessible to the processors 902 via the bus 940. The main memory 904, the static memory 914, and storage unit 916 store the instructions 908 embodying any one or more of the methodologies or functions described herein. The instructions 908 may also reside, completely or partially, within the main memory 912, within the static memory 914, within machine-readable medium 918 within the storage unit 919, within at least one of the processors 902 (e.g., within the Processor's cache memory), or any suitable combination thereof, during execution thereof by the machine 900.

The I/O components 938 may include a wide variety of components to receive input, provide output, produce output, transmit information, exchange information, capture measurements, and so on. The specific I/O components 938 that are included in a particular machine will depend on the type of machine. For example, portable machines such as mobile phones may include a touch input device or other such input mechanisms, while a headless server machine will likely not include such a touch input device. It will be appreciated that the I/O components 938 may include many other components that are not shown in FIG. 9. In various examples, the I/O components 938 may include user output components 924 and user input components 926. The user output components 924 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 926 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 938 may include biometric components 928, motion components 930, environmental components 932, or position components 934, among a wide array of other components. For example, the biometric components 928 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 930 include acceleration sensor components (e.g., accelerometer), gravitation sensor components, rotation sensor components (e.g., gyroscope).

The environmental components 932 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 3600 photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 934 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 938 further include communication components 936 operable to couple the machine 900 to a network 920 or devices 922 via respective coupling or connections. For example, the communication components 936 may include a network interface Component or another suitable device to interface with the network 920. In further examples, the communication components 936 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 922 may be another machine or any of a wide variety of peripheral devices (e.g., a peripheral device coupled via a USB).

Moreover, the communication components 636 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 936, such as location via Internet Protocol (IP) geolocation, location via Wi-Fi® signal triangulation, location via detecting an NFC beacon signal that may indicate a particular location, and so forth.

The various memories (e.g., main memory 912, static memory 914, and memory of the processors 902) and storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed examples.

The instructions 908 may be transmitted or received over the network 920, using a transmission medium, via a network interface device (e.g., a network interface component included in the communication components 936) and using any one of several well-known transfer protocols (e.g., hypertext transfer protocol (HTTP)). Similarly, the instructions 608 may be transmitted or received using a transmission medium via a coupling (e.g., a peer-to-peer coupling) to the devices 922.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
in a messaging system for exchanging data over a network, detecting a request to communicate a voice chat message from a sender client device associated with a sender identification to a recipient associated with a recipient identification;
in response to the request:
receiving input audio stream associated with the sender identification;
analyzing one or more audio characteristics of the input audio stream to determine a qualitative characteristic representing the input audio stream, the qualitative characteristic indicating one of a plurality of predetermined volume levels of the input audio stream;
synchronously with the receiving of the input audio stream generating text corresponding to audio content from the input audio stream;
synchronously with the generating of text corresponding to audio content from the input audio stream, causing rendering of the generated text on the sender client device; and
causing to synchronously render, on a recipient client device associated with the recipient identification, the generated text, the audio content, a representation of the qualitative characteristic from the input audio stream, and the sender identification, the representation of the qualitative characteristic comprising a text label and being rendered as associated with the sender identification.

2. The method of claim 1, comprising:
causing inserting in a first chat conversation user interface associated with the sender identification a first voice chat message comprising the generated text; and
causing inserting in a second chat conversation user interface associated with the recipient identification a second voice chat message comprising the generated text;
the first chat conversation user interface included in a first messaging client implemented by one or more processors of the sender client device, the second chat conversation user interface included in a second messaging client implemented by one or more processors of the recipient client device.

3. The method of claim 2, wherein the generating of the text from the audio content comprises using a speech recognition engine included in the first messaging client.

4. The method of claim 2, wherein the generating of the text from the audio content comprises using a speech recognition engine hosted at a backend system, the backend system providing the first messaging client and the second messaging client.

5. The method of claim 2, wherein the second voice chat message comprises a visual indication of an audio source, the visual indication of an audio source positioned in the second chat conversation user interface as associated with the generated text and as associated with the sender identification.

6. The method of claim 5, wherein the second voice chat message is actionable to playback the audio content subsequent to completion of the rendering of the generated text on the recipient client device.

7. The method of claim 1, comprising:
storing the audio content in the messaging system as associated with the sender identification;
receiving an instruction to delete a first voice chat message; and
deleting the audio content stored in the messaging system in response to the instruction to delete the first voice chat message.

8. The method of claim 1, wherein the one or more audio characteristics include one or more of volume, pitch, and tone.

9. The method of claim 1, wherein the representation of the qualitative characteristic indicates a whisper, talking softly or talking loudly.

10. A system comprising:
one or more processors; and
a non-transitory computer readable storage medium comprising instructions that when executed by the one or more processors cause the one or more processors to perform operations comprising:
in a messaging system for exchanging data over a network, detecting a request to communicate a voice chat message from a sender client device associated with a sender identification to a recipient associated with a recipient identification; and
in response to the request:
receiving input audio stream associated with the sender identification;
analyzing one or more audio characteristics of the input audio stream to determine a qualitative characteristic representing the input audio stream, the qualitative characteristic indicating one of a plurality of predetermined volume levels of the input audio stream;
synchronously with the receiving of the input audio stream generating text corresponding to audio content from the input audio stream;
synchronously with the generating of text corresponding to audio content from the input audio stream, causing rendering the generated text on the sender client device; and
causing to synchronously render, on a recipient client device associated with the recipient identification, the generated text, the audio content, a representation of the qualitative characteristic representing the input audio stream, and the sender identification, the representation of the qualitative characteristic comprising a text label and being rendered as associated with the sender identification.

11. The system of claim 10, wherein the operations caused by instructions executed by the one or more processors include:
causing inserting in a first chat conversation user interface associated with the sender identification a first voice chat message comprising the generated text; and
causing inserting in a second chat conversation user interface associated with the recipient identification a second voice chat message comprising the generated text;
the first chat conversation user interface included in a first messaging client implemented by one or more processors of the sender client device, the second chat conversation user interface included in a second messaging client implemented by one or more processors of the recipient client device.

12. The system of claim 11, wherein the generating of the text from the audio content comprises using a speech recognition engine included in the first messaging client.

13. The system of claim 11, wherein the generating of the text from the audio content comprises using a speech recognition engine hosted at a backend system, the backend system providing the first messaging client and the second messaging client.

14. The system of claim 11, wherein the second voice chat message comprises a visual indication of an audio source, the visual indication of an audio source positioned in the second chat conversation user interface as associated with the generated text and as associated with the sender identification.

15. The system of claim 14, wherein the second voice chat message is actionable to playback the audio content subsequent to completion of the rendering of the generated text on the recipient client device.

16. The system of claim 10, wherein the operations caused by instructions executed by the one or more processors include:
storing the audio content in the messaging system as associated with the sender identification;
receiving an instruction to delete a first voice chat message; and
deleting the audio content stored in the messaging system in response to the instruction to delete the first voice chat message.

17. The system of claim 10, wherein the one or more audio characteristics include one or more of volume, pitch, and tone.

18. A machine-readable non-transitory storage medium having instruction data executable by a machine to cause the machine to perform operations comprising:
in a messaging system for exchanging data over a network, detecting a request to communicate a voice chat message from a sender client device associated with a sender identification to a recipient associated with a recipient identification; and
in response to the request:
receiving input audio stream associated with the sender identification;
analyzing one or more audio characteristics of the input audio stream to determine a qualitative characteristic representing the input audio stream, the qualitative characteristic indicating one of a plurality of predetermined volume levels of the input audio stream;
synchronously with the receiving of the input audio stream generating text corresponding to audio content from the input audio stream;
synchronously with the generating of text corresponding to audio content from the input audio stream, causing rendering the generated text on the sender client device; and
causing to synchronously render, on a recipient client device associated with the recipient identification, the generated text, the audio content, a representation of the qualitative characteristic from the input audio stream, and the sender identification, the representation of the qualitative characteristic comprising a text label and being rendered as associated with the sender identification.

19. The method of claim 2, wherein the second voice chat message comprises a visual indication of an audio message in progress, the visual indication of the audio message positioned in the second chat conversation user interface as associated with the generated text, the representation of the qualitative characteristic of the input audio stream, and the sender identification.

20. The system of claim 11, wherein the second voice chat message comprises a visual indication of an audio message in progress, the visual indication of the audio message positioned in the second chat conversation user interface as associated with the generated text, the representation of the qualitative characteristic of the input audio stream, and the sender identification.

* * * * *